(12) United States Patent
Liu et al.

(10) Patent No.: US 10,591,771 B2
(45) Date of Patent: Mar. 17, 2020

(54) BLACKLIGHT MODULE AND DISPLAY APPARATUS

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Tongmin Liu, Beijing (CN); Jun Xu, Beijing (CN); Qing Zhang, Beijing (CN); Fusheng Huang, Beijing (CN); Shouzheng Wu, Beijing (CN); Heng Zhang, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 16/306,937

(22) PCT Filed: Mar. 21, 2018

(86) PCT No.: PCT/CN2018/079782
§ 371 (c)(1),
(2) Date: Dec. 4, 2018

(87) PCT Pub. No.: WO2018/201814
PCT Pub. Date: Nov. 8, 2018

(65) Prior Publication Data
US 2019/0137821 A1    May 9, 2019

(30) Foreign Application Priority Data
May 3, 2017 (CN) .................. 2017 2 0480792 U

(51) Int. Cl.
*G02F 1/1335* (2006.01)
*F21V 8/00* (2006.01)

(52) U.S. Cl.
CPC ..... *G02F 1/133603* (2013.01); *G02B 6/0008* (2013.01); *G02B 6/0088* (2013.01);
(Continued)

(58) Field of Classification Search
CPC ........... G02F 2203/11; G02F 1/133603; G02F 1/133615; G02F 1/133606;
(Continued)

(56) References Cited

U.S. PATENT DOCUMENTS

2006/0002141 A1* 1/2006 Ouderkirk ............ G02B 6/0001
362/609
2009/0231515 A1* 9/2009 Keam ................ G02F 1/133602
349/71

(Continued)

*Primary Examiner* — Jia X Pan
(74) *Attorney, Agent, or Firm* — Nath, Goldberg & Meyer; Joshua B. Goldberg

(57) ABSTRACT

Disclosed are a backlight module and a display apparatus. The backlight module includes an infrared light source, an optical fiber and a conversion component. The infrared light source is connected with an input end of the optical fiber and configured to provide infrared light to the input end of the optical fiber. An output end of the optical fiber is connected with the conversion component and configured to transmit the infrared light to the conversion component. The conversion component includes a tube body, and a plurality of light emitting elements are arranged along an extending direction of the tube body successively in the tube body. The light emitting elements are configured to emit visible light under the irradiation of the infrared light.

20 Claims, 3 Drawing Sheets

(52) U.S. Cl.
CPC .. *G02F 1/133604* (2013.01); *G02F 1/133606* (2013.01); *G02F 1/133615* (2013.01); *G02F 2001/133614* (2013.01); *G02F 2001/133624* (2013.01); *G02F 2203/11* (2013.01)

(58) Field of Classification Search
CPC ... G02F 1/133604; G02F 2001/133624; G02F 2001/133614; G02B 6/0088; G02B 6/0008
See application file for complete search history.

(56) References Cited

U.S. PATENT DOCUMENTS

| | | | |
|---|---|---|---|
| 2010/0073600 A1* | 3/2010 | Itoh | G02B 6/0028 349/65 |
| 2016/0014399 A1* | 1/2016 | Wang | H04N 9/3161 348/60 |

* cited by examiner

-Related Art-

BLACKLIGHT MODULE AND DISPLAY APPARATUS

CROSS-REFERENCE TO RELATED APPLICATION

This is a National Phase Application filed under 35 U.S.C. 371 as a national stage of PCT/CN2018/079782, filed on Mar. 21, 2018, an application claiming the benefit of Chinese Patent Application No. 201720480792.6, filed on May 3, 2017, the entire contents of which are hereby incorporated by reference.

TECHNICAL FIELD

The present disclosure relates to the field of display technology, and particularly, to a backlight module and a display apparatus.

BACKGROUND

A backlight is a kind of device used in a liquid crystal display (LCD) apparatus. The backlight mainly includes a light source, a light guide plate or a diffuser plate, an optical film(s), a structural member(s) and the like.

SUMMARY

In an aspect, the present disclosure provides a backlight module including an infrared light source, an optical fiber and a conversion component. The infrared light source is connected with an input end of the optical fiber and configured to provide infrared light to the input end of the optical fiber. An output end of the optical fiber is connected with the conversion component and configured to transmit the infrared light to the conversion component. The conversion component includes a tube body, and a plurality of light emitting elements are arranged along an extending direction of the tube body successively in the tube body. The plurality of light emitting elements are configured to emit visible light under the irradiation of the infrared light.

In some embodiments, the tube body is provided with a plurality of tapered holes arranged along the extending direction of the tube body successively, and the plurality of light emitting elements are arranged in the plurality of tapered holes in a one-to-one correspondence.

In some embodiments, the backlight module further includes a light guide plate, and the tube body is provided at a light receiving side of the light guide plate.

In some embodiments, an orthographic projection of the tube body on a light receiving surface of the light guide plate is of a linear shape, a U shape, or a spiral shape.

In some embodiments, the tube body is distributed uniformly with respect to the light receiving surface of the light guide plate.

In some embodiments, the backlight module further includes a diffuser plate, and the tube body is provided at a position facing a light receiving surface of the diffuser plate.

In some embodiments, an orthographic projection of the tube body on the light receiving surface of the diffuser plate is of a linear shape, a U shape, or a spiral shape.

In some embodiments, the tube body is distributed uniformly with respect to the light receiving surface of the diffuser plate.

In some embodiments, the tube is formed as an integral structure by 3D printing.

In some embodiments, each of the light emitting elements has a size in a micron order or a nanometer order.

In some embodiments, the tube body has a diameter in a micron order.

In embodiments, each of the light emitting elements includes a light emitting material doped with a rare earth material.

In some embodiments, the tube body is made of a flexible material, and the tube body is bendable.

In another aspect, the present disclosure provides a display apparatus including a backlight module and a display module, and the backlight module is any one of the backlight modules described herein.

DETAILED DESCRIPTION

To make those skilled in the art better understand the technical solutions of the present disclosure, a backlight module and a display apparatus according to the present disclosure will be described in detail below in conjunction with the accompanying drawings.

A backlight is a kind of device used in a liquid crystal display (LCD) apparatus, and the light emitting effect of the backlight may directly affect the visual effect of the liquid crystal display module (LCM). Backlights can be classified into direct type backlights and edge type backlights. A backlight may include a light source, a light guide plate or a diffuser plate, an optical film(s), a structural member(s), and the like.

Figure 1:
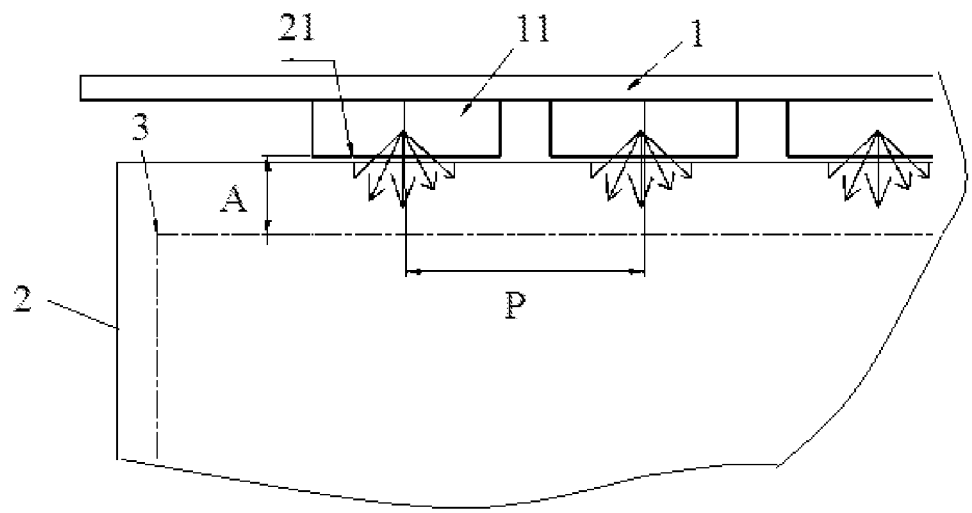
FIG. 1 is a partial structural diagram of a backlight in the related art.

FIG. 1 is a partial structural diagram of a backlight in the related art. The backlight illustrated in FIG. 1 is an edge type backlight. As illustrated in FIG. 1, an existing light source includes a printed circuit board 1 and a plurality of LED (light emitting diode) lamps 11 arranged on the printed circuit board 1. The plurality of LED lamps 11 are provided to face a light receiving surface of a light guide plate 2, and are arranged along a lateral side of the light guide plate 2 successively. Light emitted from a light emitting surface 21 of the LED lamps 11 transmits through the light guide plate 2 and exits from an effective light emitting area 3 of a display module.

The above light source inevitably has the following issues in actual applications. First, considering a ratio of a distance A between the light emitting surface 21 of the LED lamp 11 and the effective light emitting area 3 of the display module to a pitch P between centers of two adjacent LED lamps 11, the larger the ratio of the distance A to the pitch B, the less obvious the Hot-spot phenomenon (which refers to a screen defect of uneven brightness), and the better the screen display effect, especially at the light receiving side. However, a certain pitch must exist between two adjacent LED lamps, resulting in that the pitch P between centers of the two adjacent LED lamps is larger than 20 mm. As a result, the ratio of the distance A to the pitch P is relatively small, such that images of the display module have the Hot-spot phenomenon.

Second, the LED lamp converts electric energy to optical energy and generates heat during the conversion, resulting in that a heat dissipation design has to be considered in design of the display module.

Furthermore, a thickness of the light source is mainly limited by a thickness of the LED lamp 11, and it is difficult to achieve a thin design of the liquid crystal display module.

Accordingly, the present disclosure provides, inter alia, a backlight module and a display apparatus that substantially obviate one or more of the problems due to limitations and disadvantages of the related art. In an aspect, the present disclosure provides a backlight module. In some embodiments, the backlight module includes an infrared light source, an optical fiber and a conversion component. The infrared light source is connected with an input end of the optical fiber and configured to provide infrared light to the input end of the optical fiber. An output end of the optical fiber is connected with the conversion component and configured to transmit the infrared light to the conversion component. The conversion component includes a tube body, and a plurality of light emitting elements are arranged along an extending direction of the tube body successively in the tube body. The plurality of light emitting elements are configured to emit visible light under the irradiation of the infrared light.

Figure 2:
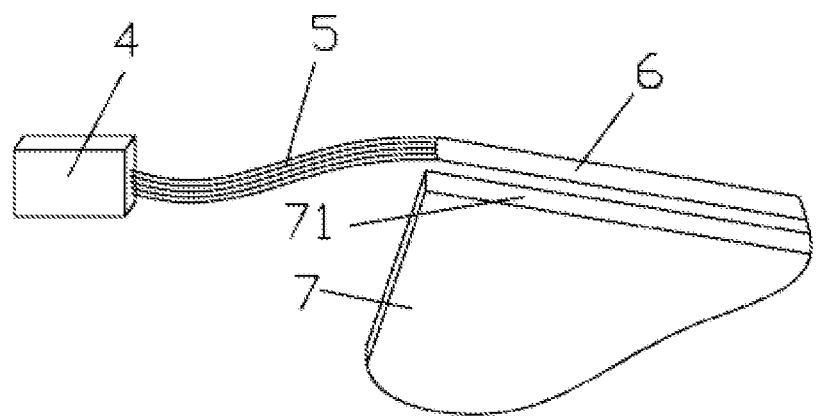
FIG. 2 is a partial structural diagram of a backlight module in some embodiments according to the present disclosure.
Figure 3A:
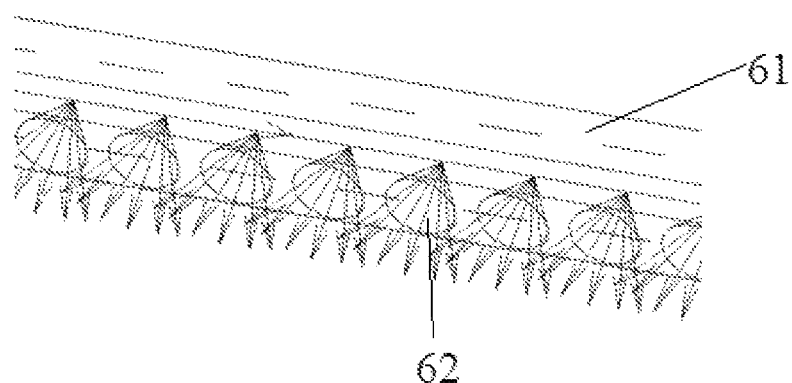
FIG. 3A is an enlarged partial view of a tube body in some embodiments according to the present disclosure.
Figure 3B:
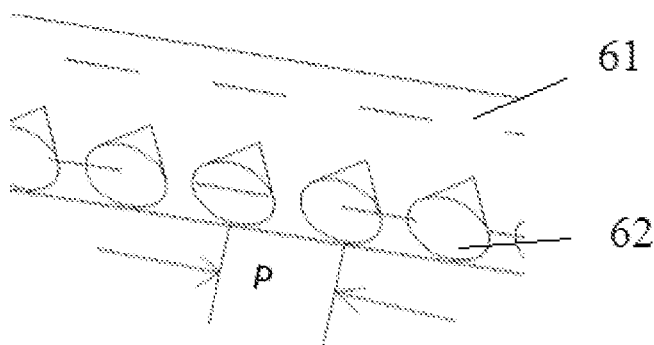
FIG. 3B is a schematic diagram illustrating light emitting elements in some embodiments according to the present disclosure.

FIG. 2 is a partial structural diagram of a backlight module in some embodiments according to the present disclosure. FIG. 3A is an enlarged partial view of a tube body in some embodiments according to the present disclosure. FIG. 3B is a schematic diagram illustrating light emitting elements in some embodiments according to the present disclosure. Referring to FIGS. 2, 3A and 3B, the backlight module in some embodiments includes an infrared light source 4, an optical fiber 5, a conversion component 6 and a light guide plate 7. The infrared light source 4 is connected with an input end of the optical fiber 5 and configured to provide infrared light to the input end of the optical fiber. An output end of the optical fiber 5 is connected with the conversion component 6 and configured to transmit the infrared light to the conversion component 6. The conversion component 6 includes a tube body 61, and a plurality of light emitting elements 62 are arranged along an extending direction of the tube body 61 successively in the tube body 61. The plurality of light emitting elements 62 are configured to emit visible light under the irradiation of the infrared light.

In some embodiments and referring to FIG. 2, the tube body 6 is provided at a side of a light receiving surface 71 of the light guide plate 7. In some embodiments, the tube body 61 is made of a flexible material and is bendable. In some embodiments, the tube body 61 is of an existing optical fiber structure, but is provided with a plurality of tapered holes in the tube wall, as will be described below in more details. In some embodiments, the light emitting element 62 may include a light emitting material doped with a rare earth material. The rare earth material may be a nano particle of lanthanide, for example. Examples of the light emitting material include but are not limited to silicon dioxide doped with a rare earth material. As illustrated in FIG. 3A, infrared light excites the light emitting elements 62 (more specifically, excites the rare earth material in the light emitting elements 62) to emit visible light when transmitting through the tube body 61, and thus each of the light emitting elements 62 may be regarded as a point light source.

As illustrated in FIG. 3B, since the pitch P between centers of two adjacent light emitting elements 62 is in a micron order or even a nanometer order, the ratio of the distance between the light emitting surface of the light emitting element 62 and the effective light emitting area of the display module to the pitch P is very large, so that the Hot-spot phenomenon is eliminated, thereby improving the screen display effect, especially at the light receiving side. Meanwhile, since the infrared light source 4 is away from the display module, i.e., the infrared light source 4 is located out of the display module and connected with the conversion component 6 through the optical fiber 5, the heat generated by the infrared light source 4 during the conversion of the electric energy to the optical energy will not affect the display module, thereby alleviating the heat dissipation problem of the display module.

As illustrated in FIGS. 3A and 3B, in some embodiments, the tube body 61 is provided with a plurality of tapered holes arranged along the extending direction of the tube body 61 successively, and the plurality of light emitting elements 62 are arranged (e.g., filled) in the plurality of tapered holes in a one-to-one correspondence. By having a tapered structure of the light emitting element 62, the visible light emitted from the light emitting element 62 can be converged, such that more light rays irradiate towards the light receiving surface 71 of the light guide plate 7. It should be understood that an opening (i.e., the light emitting surface of the light emitting element 62) of the tapered hole should face the light receiving surface 71 of the light guide plate 7.

Figure 4:
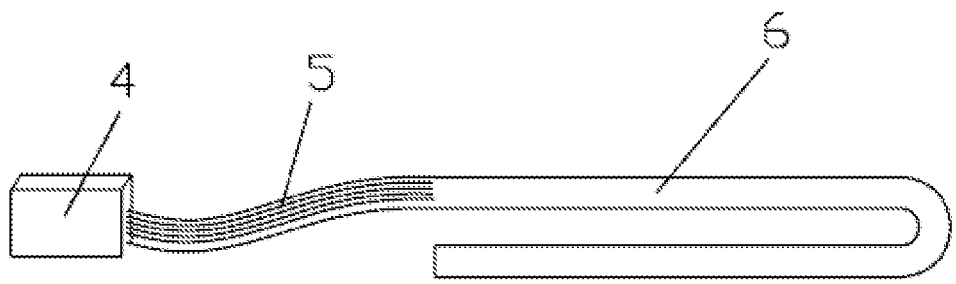
FIG. 4 is a diagram illustrating a tube body in some embodiments according to the present disclosure.
Figure 5:
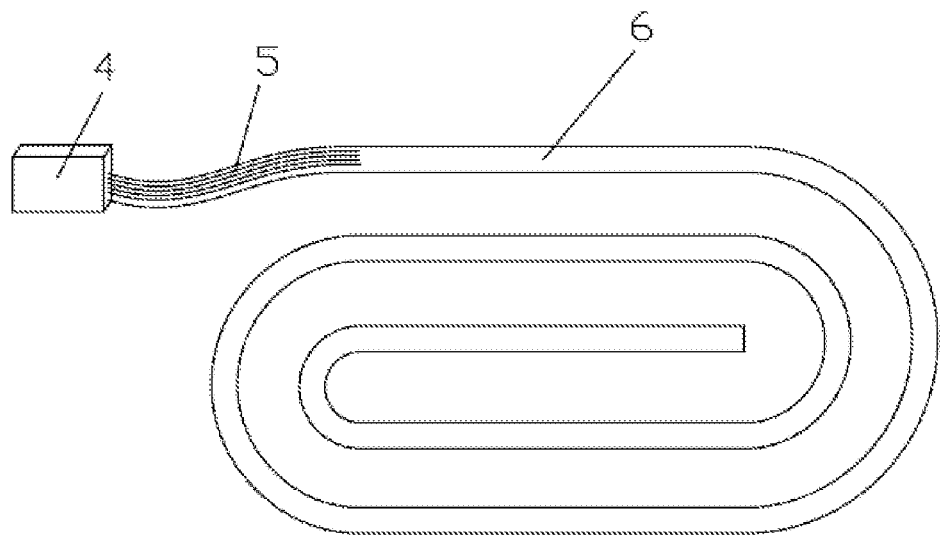
FIG. 5 is a diagram illustrating a tube body in some embodiments according to the present disclosure.

In some embodiments, an orthographic projection of the tube body 61 on the light receiving surface 71 of the light guide plate 7 is of a linear shape. However, the present disclosure is not limited thereto. In actual applications, the orthographic projection of the tube body 61 on the light receiving surface 71 of the light guide plate 7 may also have any other shapes. FIG. 4 is a schematic diagram illustrating a tube body in some embodiments according to the present disclosure. FIG. 5 is a schematic diagram illustrating a tube body in some embodiments according to the present disclosure. As illustrated in FIG. 4, the orthographic projection of the tube body 61 on the light receiving surface 71 of the light guide plate 7 may also have a U shape. As illustrated in FIG. 5, the orthographic projection of the tube body 61 on the light receiving surface 71 of the light guide plate 7 may also have a spiral shape.

In some embodiments, the tube body 61 is distributed uniformly with respect to the light receiving surface 71 of the light guide plate 7 to improve uniformity of light rays entering the light receiving surface 71, thereby further improving the screen display effect, especially at the light receiving side.

In some embodiments, the tube body 61 is formed as an integral structure by 3D (three-dimensional) printing. As such, the tube body 61 may have a diameter in a micron order to reduce a thickness of the light source, thereby facilitating the thin design of the display module.

It should be noted that the backlight module as illustrated in FIG. 2 is of a side type structure, but the present disclosure is not limited thereto. In actual applications, the backlight module may also be of a direct type structure.

Figure 6:
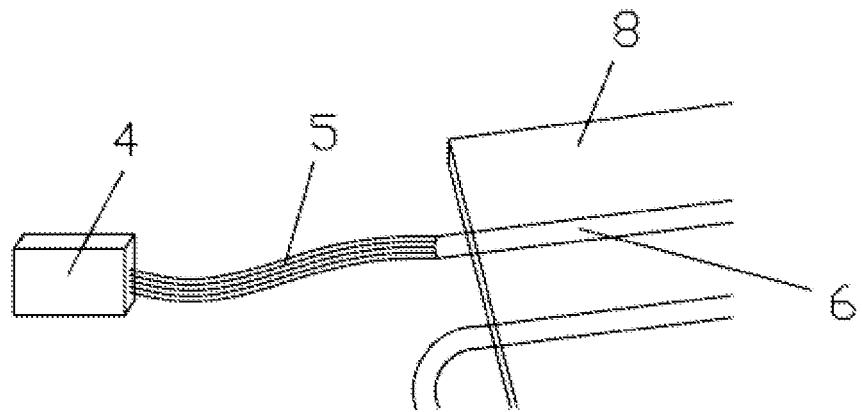
FIG. 6 is a partial structural diagram of a backlight module in some embodiments according to the present disclosure.

FIG. 6 is a partial structural diagram of a backlight module in some embodiments according to the present disclosure. As illustrated in FIG. 6, for a backlight module with a direct type structure, it includes an infrared light source 4, an optical fiber 5, a conversion component 6 and a diffuser plate 8. The infrared light source 4, the optical fiber 5 and the conversion component 6 as illustrated in FIG. 6 have the same structures and functions as those of the backlight module with the side type structure as illustrated in FIG. 2, and thus will not be redundantly described here. The difference between the backlight module in FIG. 6 and that in FIG. 2 lies in that the tube body 61 is provided at a position facing a light receiving surface of the diffuser plate 8.

Further, similar to the backlight module with the side type structure, an orthographic projection of the tube body 61 on the light receiving surface of the diffuser plate 8 is of a linear shape, a U shape, or a spiral shape. In some embodiments, the tube body 61 is distributed uniformly with respect to the light receiving surface of the diffuser plate 8, so as to further improve the screen display effect.

The backlight module according to embodiments of the present disclosure utilizes the infrared light source to transmit through the optical fiber the infrared light to the conversion component having the tube body, in which the plurality of light emitting elements are arranged along the extending direction of the tube body successively, the light emitting element emits the visible light under the irradiation of the infrared light. Since the pitch between centers of two adjacent light emitting elements is in a micron order or even a nanometer order, the ratio of the distance between the light emitting surface of the light emitting element and the effective light emitting area of the display module to the pitch between the centers of the two adjacent light emitting elements is very large, so that the Hot-spot phenomenon is eliminated, thereby improving the screen display effect, especially at the light receiving side. Meanwhile, since the infrared light source is away from the display module, the heat generated by the infrared light source during the conversion of the electric energy to the optical energy will not affect the display module, thereby alleviating the heat dissipation problem of the display module. Furthermore, the diameter of the tube body may have a micron order, so that the thickness of the light source can be reduced, thereby facilitating the thin design of the display module.

In another aspect, the present disclosure further provides a display apparatus including a backlight module and a display module. The backlight module may be any one of the above-mentioned backlight modules according to the embodiments of the present disclosure.

By having any one of the above-mentioned backlight modules according to the embodiments of the present disclosure, the display apparatus according to the embodiments of the present disclosure can eliminate the Hot-spot phenomenon, alleviate the heat dissipation problem of the display module, and achieve the thin design of the display apparatus.

It can be understood that the foregoing embodiments are merely exemplary embodiments used for describing the principle of the present disclosure, but the present disclosure is not limited thereto. Those of ordinary skill in the art may make various variations and improvements without departing from the spirit and essence of the present invention, and these variations and improvements shall also fall into the protection scope of the present disclosure.

What is claimed is:

1. A backlight module, comprising an infrared light source, an optical fiber and a conversion component, wherein
   the infrared light source is connected with an input end of the optical fiber and configured to provide infrared light to the input end of the optical fiber;
   an output end of the optical fiber is connected with the conversion component and configured to transmit the infrared light to the conversion component; and
   the conversion component comprises a tube body, a plurality of light emitting elements are arranged along an extending direction of the tube body successively in the tube body, and the plurality of light emitting elements being configured to emit visible light under irradiation of the infrared light.

2. The backlight module of claim 1, wherein the tube body is provided with a plurality of tapered holes arranged along the extending direction of the tube body successively, and the plurality of light emitting elements are arranged in the plurality of tapered holes in a one-to-one correspondence.

3. The backlight module of claim 1, wherein the backlight module further comprises a
   light guide plate, and
   the tube body is provided at a light receiving side of the light guide plate.

4. The backlight module of claim 3, wherein an orthographic projection of the tube body on a light receiving surface of the light guide plate is of a linear shape, a U shape, or a spiral shape.

5. The backlight module of claim 4, wherein the tube body is distributed uniformly with respect to the light receiving surface of the light guide plate.

6. The backlight module of claim 1, wherein the backlight module further comprises a
   diffuser plate, and
   the tube body is provided at a position facing a light receiving surface of the diffuser plate.

7. The backlight module of claim 6, wherein an orthographic projection of the tube body on the light receiving surface of the diffuser plate is of a linear shape, a U shape, or a spiral shape.

8. The backlight module of claim 7, wherein the tube body is distributed uniformly with respect to the light receiving surface of the diffuser plate.

9. The backlight module of claim 1, wherein the tube is formed as an integral structure by 3D printing.

10. The backlight module of claim 1, wherein the light emitting elements have a size in a micron order or a nanometer order.

11. The backlight module of claim 1, wherein the tube body has a diameter in a micron order.

12. The backlight module of claim 1, wherein the light emitting elements comprise a light emitting material doped with a rare earth material.

13. The backlight module of claim 1, wherein the tube body is made of a flexible material, and the tube body is bendable.

14. A display apparatus, comprising a backlight module and a display module, wherein the backlight module is the backlight modules according to claim 1.

15. The backlight module of claim 2, wherein the backlight module further comprises a
   light guide plate, and
   the tube body is provided at a light receiving side of the light guide plate.

16. The backlight module of claim 15, wherein an orthographic projection of the tube body on a light receiving surface of the light guide plate is of a linear shape, a U shape, or a spiral shape.

17. The backlight module of claim 16, wherein the tube body is distributed uniformly with respect to the light receiving surface of the light guide plate.

18. The backlight module of claim 2, wherein the backlight module further comprises a
diffuser plate, and
the tube body is provided at a position facing a light receiving surface of the diffuser plate.

19. The backlight module of claim 18, wherein an orthographic projection of the tube body on the light receiving surface of the diffuser plate is of a linear shape, a U shape, or a spiral shape.

20. The backlight module of claim 19, wherein the tube body is distributed uniformly with respect to the light receiving surface of the diffuser plate.

* * * * *